United States Patent [19]

Tsuruta

[11] Patent Number: 4,719,997
[45] Date of Patent: Jan. 19, 1988

[54] DISC BRAKE WITH PARKING BRAKE MECHANISM

[75] Inventor: Matsuhisa Tsuruta, Toyota, Japan
[73] Assignee: Aisin Seiki Kabushiki Kaisha, Kariya, Japan
[21] Appl. No.: 30,285
[22] Filed: Mar. 23, 1987

Related U.S. Application Data

[63] Continuation of Ser. No. 689,303, Jan. 7, 1985, abandoned.

[30] Foreign Application Priority Data

Mar. 28, 1984 [JP] Japan .................................. 59-60038

[51] Int. Cl.$^4$ ............................................. F16D 65/56
[52] U.S. Cl. ................................... 188/71.9; 188/72.6; 188/72.7; 188/72.9; 188/106 F; 188/196 D; 192/111 A
[58] Field of Search ................... 188/72.6, 72.7, 72.9, 188/71.9, 106 F, 196 D; 192/111 A, 70.25, 70.26

[56] References Cited

U.S. PATENT DOCUMENTS

| | | | |
|---|---|---|---|
| 3,507,367 | 4/1970 | Brown et al. | 188/106 F |
| 3,633,712 | 1/1972 | Farr | 188/71.9 |
| 3,783,981 | 1/1974 | Burgdorf | 188/106 F |
| 3,983,975 | 10/1976 | Wright | 188/196 D |
| 4,056,173 | 11/1977 | Farr | 188/72.6 |
| 4,544,045 | 10/1985 | Runkle | 188/72.7 |

FOREIGN PATENT DOCUMENTS

| | | | |
|---|---|---|---|
| 39366 | 1/1971 | Japan | 188/72.6 |
| 1198443 | 7/1970 | United Kingdom | 188/72.6 |

*Primary Examiner*—George E. A. Halvosa
*Attorney, Agent, or Firm*—Oblon, Fisher, Spivak, McClelland & Maier

[57] ABSTRACT

A parking brake mechanism in a disc brake includes a bottomed tubular adjusting nut slidably fitted in a bore defined in a cylinder bottom coaxially with a piston with a seal ring interposed and having a closed end projecting into the cylinder and coupled to piston, an adjusting bolt axially movably threaded in the adjusting nut and having a head projecting out of the cylinder, a first spring interposed between the head and the cylinder bottom for normally urging the adjusting bolt in a direction out of the cylinder, a thrust bearing interposed between the head and the first spring for ensuring smooth rotation of the adjusting bolt, a pusher disposed coaxially with the adjusting bolt and having in one end a slot substantially perpendicular to an axis of the adjusting bolt, the pusher serving as a clutch for selective engagement with the head, a second spring for normally urging the pusher in a direction out of the cylinder, a plate having an intermediate portion extending through the slot and interposed between the pusher and the head, the plate serving as a second thrust bearing selectively engageable with a central top surface of the head, a cam shaft rotatably supported by a caliper and having a cam slot opening toward an opposite end of the pusher, the cam shaft having a parking lever secured thereto, and a toggle interposed between the cam slot and the opposite end of the pusher for axially moving the pusher in response to angular displacement of the cam slot.

11 Claims, 3 Drawing Figures

DISC BRAKE WITH PARKING BRAKE MECHANISM

This application is a continuation of application Ser. No. 689,303, filed on Jan. 7, 1985, now abandoned.

BACKGROUND OF THE INVENTION

1. Field of the Invention

The present invention relates to a disc brake with a parking brake mechanism, and more particularly to a disc brake with a parking brake mechanism in which a cup-shaped piston is axially slidably disposed in a cylinder defined in a caliper with a piston seal interposed, the piston being movable by the parking brake mechanism or a fluid supplied under pressure to the cylinder for pushing the brake pads.

2. Description of the Prior Art

One known disc brake of the type described above is disclosed in U.S. Pat. No. 3,783,981 and shown in FIG. 1 of the accompanying drawings. The prior disc brake includes a parking brake mechanism composed of an adjusting bolt 2 disposed coaxially in a cup-shaped piston 1 and secured thereto, an adjusting nut 5 threaded over the adjusting bolt 2 and connected by a thrust bearing 3 to a bottom 4b of a cylinder 4a defined in a caliper 4, a spring 7 having a lefthand end (as shown) engaging a tubular retainer 6 fixed to an inner peripheral wall of the cylinder 4a for normally urging the adjusting nut 5 to the right, a thrust bearing 8 interposed between the spring 7 and the adjusting nut 5, a piston 9 axially slidably fitted in a bore 4c defined coaxially in the cylinder 4a and confronting the adjusting nut 5 with a clearance S therebetween, a cam shaft 10 rotatably supported in the caliper 4 behind the piston 9 and having a cam slot 10a opening toward a recess 9a in a rear end of the piston 9, and a toggle 11 interposed between the cam shaft 10 and the piston 9 and interconnecting them.

When the piston 1 is pushed to the left by a fluid supplied under pressure into the cylinder 4a, the adjusting nut 5 is caused to rotate with respect to the adjusting bolt 2 moving with the piston 1 by the coaction of the spring 7 and the thrust bearing 8 for automatically adjusting a so-called pad clearance. By pushing the piston 1 into the cylinder 4a upon replacement of a pad, the adjusting nut 5 is rotated by the action of the thrust bearing 3 to bring the piston 1 and the adjusting bolt 2 back to the illustrated initial position without being rotated. Therefore, pad replacement can be effected efficiently, and there is no danger of a piston seal 12 being torn off by the piston 1.

With the known disc brake, however, many parts of the parking brake mechanism such as the adjusting bolt 2, the thrust bearing 3, the adjusting nut 5, the retainer 6, the spring 7, and the thrust bearing 8 are accommodated in the cylinder 4a, forming a complex air trapping space within the cylinder 4a from which air cannot easily be discharged.

SUMMARY OF THE INVENTION

With the above problem in view, it is an object of the present invention to provide a disc brake with a parking brake mechanism which provides for automatic adjustment of a pad clearance, efficient pad replacement, and prevention of seal ring damage, and which is composed of a reduced number of parts accommodated in a cylinder to achieve an improved air discharging capability.

Another object of the present invention is to provide a parking brake mechanism which will not produce an unwanted ineffective stroke upon actuating the parking brake, and which can be manufactured at a high rate of production without requiring an increase in the accuracies of production and assemblage of the components.

According to the present invention, there is provided a disc brake with a parking brake mechanism, including a caliper having a cylinder defined therein, a cup-shaped piston axially slidably fitted in the cylinder with a piston seal interposed therebetween, and a pad pressable in response to movement of the piston pushed by the parking brake mechanism or a fluid supplied under pressure into a chamber defined by the cylinder and piston, the parking brake mechanism comprising a bottomed tubular adjusting nut slidably fitted in a bore defined in a bottom wall of the cylinder coaxially with the piston with a seal ring interposed and having a closed end projecting into the cylinder and coupled to the piston, an adjusting bolt axially movably threaded in the adjusting nut and having a head projecting out of the cylinder, a first spring interposed between the head of the adjusting bolt and the bottom wall of the cylinder for normally urging the adjusting bolt in a direction out of the cylinder, a thrust bearing interposed between the head and the first spring for ensuring smooth rotation of the adjusting bolt, a pusher disposed in coaxial relation to the adjusting bolt and having in one end a slot extending substantially perpendicularly to an axis of the adjusting bolt, the pusher serving as a clutch for selective engagement with the head of the adjusting bolt, a second spring for normally urging the pusher in a direction out of the cylinder, a plate having an intermediate portion extending through the slot in the pusher and interposed between the pusher and the head of the adjusting bolt, the plate serving as a second thrust bearing selectively engageable with a central top surface of the head of the adjusting bolt, a cam shaft rotatably supported by the caliper and having a cam slot opening toward an opposite end of the pusher, the cam shaft having a parking lever secured thereto, and a toggle interposed between the cam slot and the opposite end of the pusher for axially moving the pusher in response to angular displacement of the cam slot.

According to the present invention, there is also provided a disc brake with a parking brake mechanism, including a caliper having a cylinder defined therein, a cup-shaped piston axially slidably fitted in the cylinder with a piston seal interposed therebetween, and a pad pressable in response to movement of the piston pushed by the parking brake mechanism or a fluid supplied under pressure into the cylinder, the parking brake mechanism comprising a bottomed tubular adjusting nut slidably fitted in a bore defined in a bottom wall of the cylinder coaxially with the piston with a seal ring interposed and having a closed end projecting into the cylinder and coupled to piston, an adjusting bolt axially movably threaded in the adjusting nut and having a head projecting out of the cylinder, a first spring interposed between the head of the adjusting bolt and the bottom wall of the cylinder for normally urging the adjusting bolt in a direction out of the cylinder, a thrust bearing interposed between the head and the first spring for ensuring smooth rotation of the adjusting bolt, a pusher disposed in coaxial relation to the adjusting bolt and axially movable supported by a support on the caliper, the pusher having in one end close to the adjusting bolt a slot extending substantially perpendicularly to an axis of the adjusting bolt, the pusher serving as a clutch for selective engagement with the head of the adjusting bolt, a plate having an intermediate portion extending through the slot in the pusher and interposed between the pusher and the head of the adjusting bolt and opposite ends supported by the support on the caliper so as to be immovable toward the adjusting bolt and movable away therefrom, the plate serving as a second thrust bearing selectively engageable with a central top surface of the head of the adjusting bolt, a second spring interposed between the plate and the pusher for normally urging them apart from each other, a cam shaft rotatably supported by the caliper and having a cam slot opening toward an opposite end of the pusher, the cam shaft having a parking lever secured thereto, and a toggle interposed between the cam slot and the opposite end of the pusher for axially moving the pusher in response to angular displacement of the cam slot.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
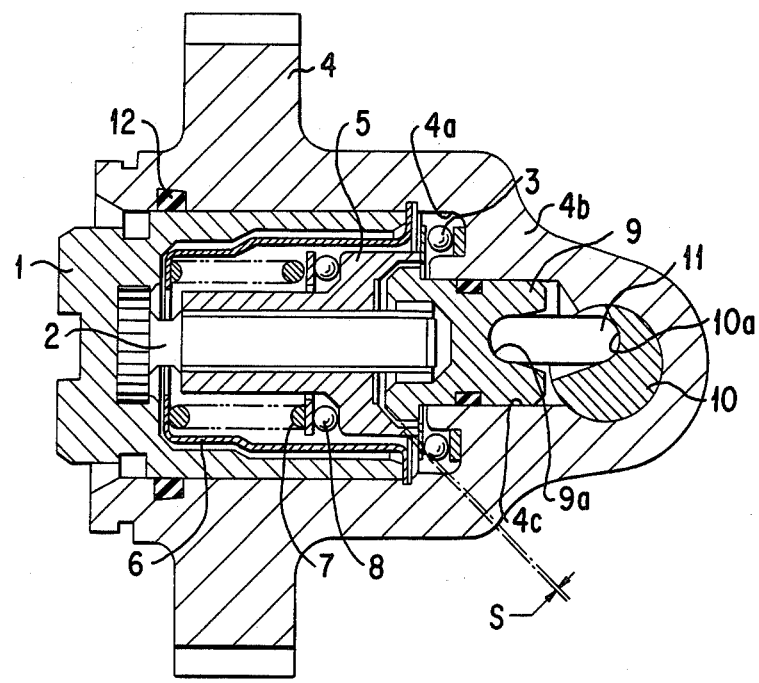
FIG. 1 is a cross-sectional view of a conventional disc brake with a parking brake mechanism.
Figure 2:
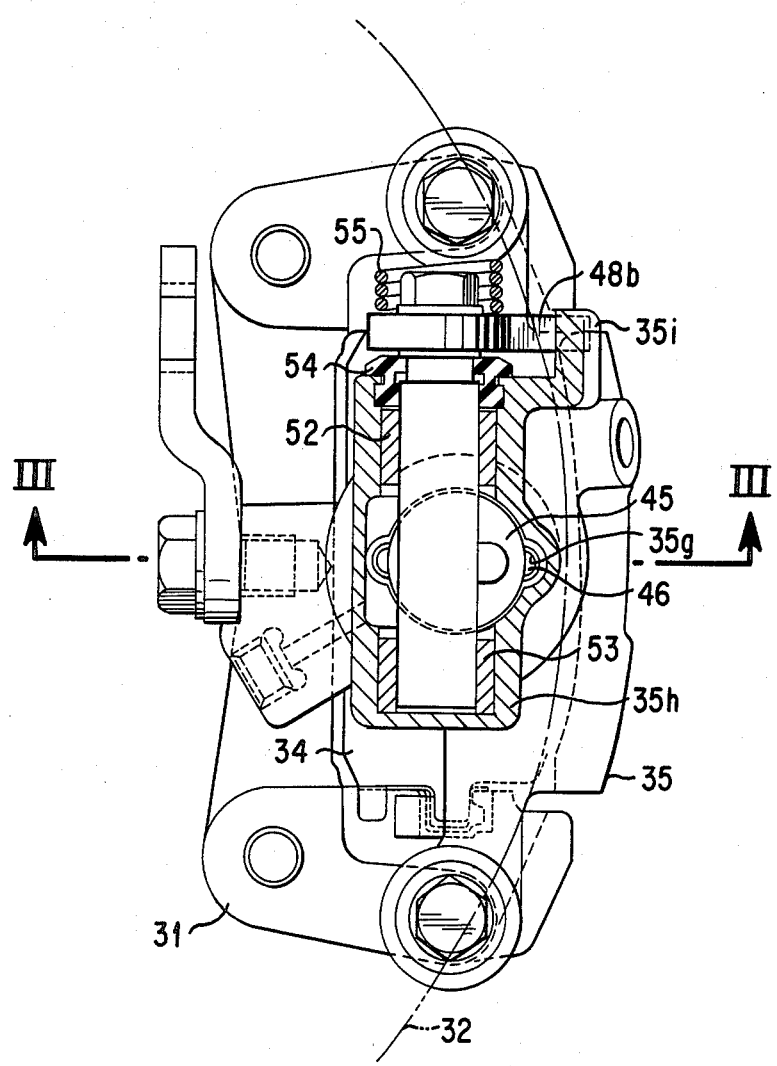
FIG. 2 is a side elevational view, partly in cross section, of a disc brake with a parking brake mechanism according to the present invention.

A disc brake according to the present invention will be described with reference to FIGS. 2 and 3.

Figure 3:
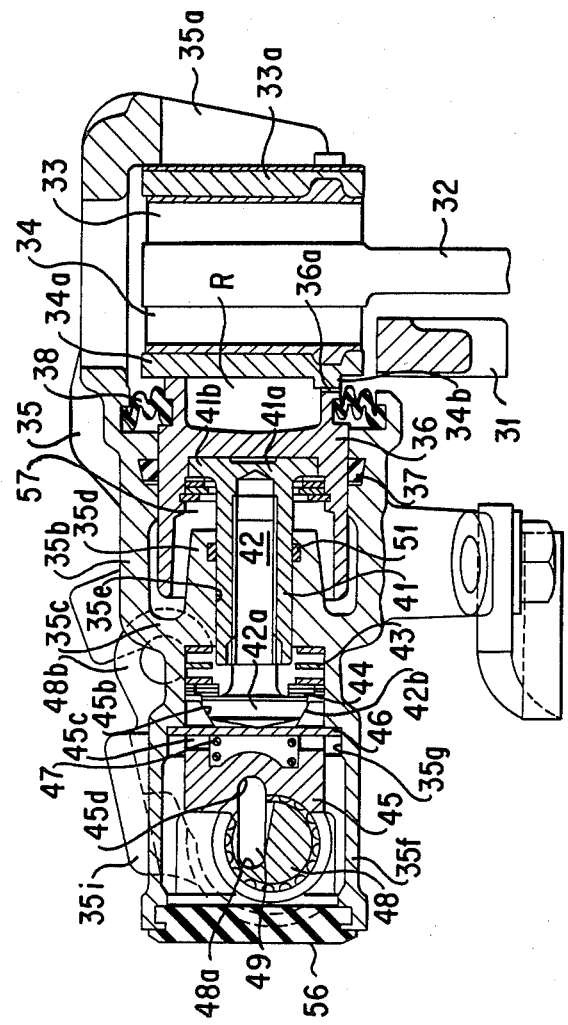
FIG. 3 is a cross-sectional view taken along III—III of FIG. 2.

The illustrated disc brake has pads 33, 34 mounted on a torque member 31 assembled on an automobile component (for example, a knuckle arm) and disposed one on each side of a disc rotor 32, the pads 33, 34 being slidable in horizontal directions as shown in FIG. 3 (Any reference hereinafter made to directions should be taken with reference to FIG. 3). A caliper 35 is mounted on the torque member 31 slidably in the horizontal directions by known means. The caliper 5 is shaped to extend astride of a portion of the disc rotor 32 in surrounding relation to the pads 33, 34. The caliper 35 has a bifurcated righthand end including a pusher arm 35a held against the back of a backing member 33a of the pad 33, and also has a cylinder 35b on a lefthand portion thereof. The cylinder 35b extends in the horizontal direction with a cup-shaped piston 36 axially slidably fitted therein with a seal ring 37 interposed therebetween, the cylinder 35b being held against the back of a backing member 34a of the pad 34. The piston 36 is movable by a fluid supplied under pressure into the chamber 57 defined by the cylinder 35b and the piston 36 or by a parking brake mechanism. A dust boot 38 is disposed between an outer periphery of the piston 36 and an outer end of the cylinder 35b. The piston 36 is locked against rotation by a projection 34b on the backing member 34a of the pad 34.

The parking brake mechanism is composed of a bottomed tubular adjusting nut 41, an adjusting bolt 42, a first spring 43, a thrust bearing 44, a pusher 45, a plate 46, a second spring 47, a cam shaft 48, and a toggle 49. The adjusting nut 41 is slidably fitted in a bore 35e in a boss 35d formed centrally on a bottom wall 35c of the cylinder 35b, with a seal ring 51 interposed between the adjusting nut 41 and the boss 35d. The adjusting nut 41 has a closed end 41a projecting into the chamber 57 and including a flange 41b nonrotatably coupled to the piston 36. The adjusting bolt 42 has screw threads of a large pitch axially movably threaded in the adjusting nut 41, and has a tapered head 42a projecting out of the cylinder 35b. A conical projection 42b (which may be spherical in shape) is integrally formed on a central top surface of the head 42a of the adjusting bolt 42.

The spring 43 and the thrust bearing 44 are interposed between the cylinder bottom 35c and the head 42a of the adjusting bolt 42 for normally urging the adjusting bolt 42 to the left in a direction out of the clinder 35b. The thrust bearing 44 is disposed between the head 42a and the spring 43 for ensuring smooth rotation of the adjusting bolt 42. The pusher 45 is positioned coaxially with the adjusting bolt 42 and is axially slidably located in a tubular portion 35f of the caliper 35 which is coaxial with the cylinder 35b, the tubular portion 35f having a lefthand end closed off by a rubber cap 56. The pusher 45 has in its righthand end a tapered hole 45b in which the head 42a of the adjusting bolt 42 is frictionally engageable, and a vertical slot 45c extending substantially perpendicularly to the axis of the adjusting bolt 42.

The plate 46 of an I shape has an intermediate portion inserted through the slot 45c in the pusher 45 and interposed between the pusher 45 and the head 42a of the adjusting bolt 42. The plate 46 has opposite ends placed in a recess 35g defined in the tubular portion 35f for preventing the plate 46 from moving toward the adjusting bolt 42 and for allowing the plate 46 to move away from the adjusting bolt 42. The plate 46 separably engages the projection 42b of the adjusting bolt 42, thus providing a thrust bearing. The second spring 47 is interposed between the pusher 45 and the plate 46 for normally urging them apart. In the illustrated position in which the parking brake is not operated, the pusher 45 is spaced slightly from the head 42a of the adjusting bolt 42. The cam shaft 48 is inserted through a second tubular portion 35h extending perpendicularly to the tubular portion 35f and is rotatably journalled by bearings 52, 53. The cam shaft 48 has a cam slot 48a opening toward a recess 45d defined in the lefthand end of the pusher 45. The cam shaft 48 also has a parking lever 48b fastened to an end thereof which projects out of the rubber cap 54. The cam shaft 45 is normally urged to turn counterclockwise (as viewed in FIG. 3) by a torsion spring 55 interposed between the lever 48b and the caliper 35. The cam shaft 48 is positioned as illustrated by the lever 48b held against a projection 35i on the caliper 35. The toggle 49 is an egg-shaped member interposed between the cam slot 48a and the recess 45d in the pusher 45. The toggle 49 serves to move the pusher 45 in the horizontal directions or axial directions in response to angular displacement of the cam slot 48a.

Operation of the foregoing arrangement is as follows: When a fluid under pressure is supplied into the chamber 57, the piston 36 is moved to the right as shown in FIG. 3 to push the pad 34 against a lefthand surface of the disc rotor 32, and at the same time the caliper 35 is moved to the left to cause the pusher arm 35a to press the pad 34 against a righthand surface of the disc rotor 32. Therefore, normal braking action is effected. At this time, the adjusting nut 41 of the parking brake mechanism is moved to the right with the piston 36 to cause the adjusting bolt 42 to project from the adjusting nut 41 through the coaction of the spring 43 and the thrust bearing 44. When the fluid pressure is removed form the chamber 57, the piston 36 returns a prescribed distance to the left due to the restoring action of the piston seal 37, and the caliper 35 moves back to the right due to frictional vibrations of the disc rotor 32 and the pad 33. In the parking brake mechanism, at this time, the adjusting nut 41 is moved a prescribed interval to the left in unison with the leftward movement of the piston 36, while the adjusting bolt 42 rotates through the coaction with the plate 46 into the adjusting nut 41 by a prescribed distance. With the arrangement of the invention, therefore, pad clearances between the disc rotor 32 and the pads 33, 34 during inoperative condition are always kept substantially constant regardless of wear on the pads 33, 34.

When the parking lever 48b is turned clockwise in FIG. 3 to turn the cam shaft 48 clockwise, the cam slot 48a is angularly displaced to the right to cause the toggle 49, the pusher 45, the adjusting bolt 42, and the adjusting nut 41 to push the piston 36 to the right. The pad 34 is pressed against the lefthand surface of the disc rotor 32, whereupon the caliper 35 is pushed to the left under reactive forces to thereby actuate the parking brake. At this time, the plate 46 is pushed by the spring 47 fixedly into the recess 35g to prevent the pusher 45 from being turned, and the head 42a of the adjusting bolt 42 frictionally engages in the tapered hole 45b in the pusher 42 to prevent the adjusting bolt 42 from being moved with respect to the adjusting nut 41. As a consequence, the parking brake is actuated without involving an unwanted ineffective stroke.

When the parking lever 48b is turned counterclockwise to turn the cam shaft 48 counterclockwise while the parking brake is being actuated, the cam slot 48a is angularly displaced to the left to cause the springs 43, 47 to allow the toggle 49, the pusher 45, the adjusting bolt 42, the adjusting nut 41, and the piston 36 to return leftward to the illustrated original position. The caliper 35 also returns to the right to release the parking brake. The adjusting bolt 42 is kept immovable with respect to the adjusting nut 41 during this time since the head 42a of the adjusting bolt 42 frictionally engages in the tapered hole 45b in the pusher 45 to prevent the adjusting bolt 42 from rotating until the adjusting bolt 42 abuts against the plate 46 and is stopped in its leftward direction, and since the spring 43 and the thrust bearing 44 become ineffective when the adjusting bolt 42 abuts against the plate 46.

When the piston 36 is pushed into the chamber 57 at the time of replacing the pads, the adjusting bolt 42 rotates and enters into the adjusting nut 41 due to the action of the thrust bearing composed of the projection 42b and the plate 46. Therefore, the piston 36 and the adjusting nut 41 are returned to the original position (which is assumed when the pads are not worn) without being rotated. Since the plate 46 is spaced from the recess 35g in the tubular portion 35f and supported in a floating condition by the spring 47 at this time, the projection 42b of the adjusting bolt 42 contacts the plate 46 at a point which coinciding with the center of rotation or the axis of the adjusting bolt 42, which is therefore allowed to rotate smoothly. Consequently, the piston 36 and the adjusting nut 41 can be returned easily to the initial position highly efficiently, and the piston seal 37 and the seal ring 51 will not be torn off by the piston 36 and the adjusting nut 41.

Of the components of the parking brake mechanism, only the closed end 41a of the adjusting nut 41 is exposed in the chamber 57, with the other components being disposed outside of the chamber 57. No complex air trapping space is therefore defined in the chamber 57, and any trapped air can easily be discharged. Also fluid circulation within chamber 57 is improved. The sliding portion of the adjusting nut 41 and the mutually threaded portions of the adjusting nut 41 and the adjusting bolt 42 extend parallel to each other or concentrically, an arrangement which reduces the dimension from the cylinder bottom 35c to the top wall of the piston 36. This allows a thermally insulating space R (vented to the atmosphere through a recess 36a defined in the righthand end of the piston 36) to be positively defined between the top wall of the piston 36 and the backing member 34a of the pad 34, resulting in a less chance of vapor lock.

Although a certain preferred embodiment has been shown and described, it should be understood that many changes and modifications may be made therein without departing from the scope of the appended claims.

What is claimed is:

1. A disc brake with a parking brake mechanism, comprising:

a caliper having a cylinder defined therein;

a cup-shaped piston axially slidably fitted in said cylinder with a piston seal interposed therebetween;

a pad pressable in response to movement of the piston pushed by the parking brake mechanism or a fluid supplied under pressure into a chamber defined by said cylinder and said piston;

a bottomed tubular adjusting nut being slidably fitted in a bore defined in a bottom wall of said cylinder coaxially with said piston with a seal ring interposed between said nut and said bore and having a closed end positioned in said chamber;

an adjusting bolt axially movably threaded in said adjusting nut and having a head projecting out of said cylinder;

a first spring located outside said chamber and interposed between said head of said adjusting bolt and said bottom wall of said cylinder for normally urging said adjusting bolt in a direction out of said cylinder;

a thrust bearing located outside said chamber and interposed between said head and said first spring for ensuring smooth rotation of said adjusting bolt;

a pusher located outside said chamber and disposed in coaxial relation to said adjusting bolt and axially movable supported by a support portion of said caliper, said pusher having at one end a slot extending substantially perpendicularly to an axis of said adjusting bolt, said pusher serving as a clutch for selective engagement with said head of the adjusting bolt;

a second spring located outside said chamber for normally urging said pusher in a direction out of said cylinder;

a plate located outside said chamber and having an intemediate portion extending through said slot in said pusher and interposed between said pusher and said head of the adjusting bolt so as to be relatively movable in an axial direction of said cylinder and having opposite ends supported by said support portion of said caliper for preventing said plate from moving toward said adjusting bolt and for allowing said plate to move away from said adjusting bolt and for preventing said pusher from being turned when said pusher serving as a clutch is engaged, said plate serving as a second thrust bearing selectively engageable with a central top surface of said head of said adjusting bolt of said intermediate portion thereof;

a cam shaft positioned outside said chamber, rotatably supported by the caliper and having a cam slot opening toward an opposite end of said pusher, said cam having a parking lever secured thereto; and a toggle interposed between said cam slot and said opposite end of said pusher for axially moving said pusher in response to angular displacement of said cam slot.

2. A disc brake according to claim 1, including a second pad disposed in confronting relation to said first-mentioned pad, a disc rotor interposed between said first and second pads, said second pad being pressable by said caliper against said disc rotor, and a fixed torque member by which said first and second pads are supported for axial sliding movement toward said disc rotor.

3. A disc brake according to claim 1, including a disc rotor, a fixed torque member by which said pad is supported for axial sliding movement toward said disc rotor, and a backing member on said pad, said piston being held against said backing member in interfitting engagement with each other for locking said piston against rotation.

4. A disc brake according to claim 1, wherein said head of said adjusting bolt has a tapered surface, said pusher having a tapered hole for frictional engagement with said tapered surface of said head.

5. A disc brake with a parking brake mechanism, comprising:
   a caliper having a cylinder defined therein;
   a piston slidable within said cylinder;
   a pad pressable in response to movement of the piston pushed by the parking brake mechanism or a fluid supplied under pressure into a chamber defined by said cylinder and said piston;
   a bottomed tubular adjusting nut being slidably fitted in a bore defined in a bottom wall of said cylinder coaxially with said piston with a seal ring interposed between said nut and said bore and coupled to said piston;
   an adjusting bolt axially movably threaded in said adjusting nut and having a head;
   a first spring interposed between said head of said adjusting bolt and said bottom wall of said cylinder for normally urging said adjusting bolt in a direction out of said cylinder;
   a thrust bearing interposed between said head and said first spring for ensuring smooth rotation of said adjusting bolt;
   a pusher disposed in coaxial relation to said adjusting bolt and axially movable supported by a support on said caliper, said pusher having in one end adjacent said adjusting bolt a slot extending substantially perpendicularly to an axis of said adjusting bolt, said pusher serving as a clutch for selective engagement with said head of the adjusting bolt;
   a plate having an intermediate portion extending through said slot in said pusher and interposed between said pusher and said head of the adjusting bolt so as to be relatively movable in an axial direction of said cylinder and opposite ends supported by said support on the caliper so as to be immovable toward said adjusting bolt and movable away therefrom and prevent said pusher from being turned when said clutch is engaged, said plate serving as a second thrust bearing selectively engageable with a central top surface of said head of said adjusting bolt at said intermediate portion thereof;
   a second spring interposed between said plate and said pusher for normally urging said plate and pusher apart from each other;
   a cam shaft rotatably supported by said caliper and having a cam slot opening toward an opposite end of said pusher, said cam shaft a parking lever secured thereto; and
   a toggle interposed between said cam slot and said opposite end of said pusher for axially moving said pusher in response to angular displacement of said cam slot.

6. A disc brake according to claim 5, including a second pad disposed in confronting relation to said first-mentioned pad, a disc rotor intrerposed between said first and second pads, said second pad being pressable by said caliper against said disc rotor, and a fixed torque member by which said first and second pads are supported for axial sliding movement toward said disc rotor.

7. A disc brake according to claim 5, including a disc rotor, a fixed torque member by which said pad is supported for axial sliding movement toward said disc rotor, and a backing member on said pad, said piston being held against said backing member in interfitting engagement with each other for locking said piston against rotation.

8. A disc brake according to claim 5, wherein said head of said adjusting bolt has a tapered surface, said pusher having a tapered hole for frictional engagement with said tapered surface of said head.

9. A disc brake according to claim 5, wherein said caliper has a first tubular portion coaxial with said cylinder and a second tubular portion perpendicular to said first tubular portion, said first tubular portion accommodating therein said head of the adjusting bolt, said first spring, said thrust bearing, said pusher, said plate, said second spring, and said toggle, said cam shaft being disposed in said second tubular portion.

10. A disc brake according to claim 9, wherein said opposite ends of said plate are slidably fitted in an axial recess defined in an inner periphery of said first tubular portion, said plate being prevented from moving toward said cylinder by an end of said axial recess which is close to said cylinder.

11. A disc brake according to claim 9, wherein said head of said adjusting bolt has a tapered surface, said pusher having a tapered hole for frictional engagement with said tapered surface of said head, said opposite ends of said plate being slidably fitted in an axial recess defined in an inner periphery of said first tubular portion, said plate being prevented from moving toward said cylinder by an end of said axial recess which is close to said cylinder, said second spring being disposed in a hole defined in said pusher in contiguous relation to said tapered hole in the pusher.

* * * * *

UNITED STATES PATENT AND TRADEMARK OFFICE
CERTIFICATE OF CORRECTION

PATENT NO. : 4,719,997
DATED : 01/19/88
INVENTOR(S) : Matsuhisa Tsuruta

It is certified that error appears in the above-identified patent and that said Letters Patent is hereby corrected as shown below:

Column 4, line 17, change "clinder" to --cylinder--;

Column 5, line 4, change "form" to --from--, line 64, change "coinciding" to --coincides--; Column 6, line 64, change "intemediate" to --intermediate--; and Column 8, line 24, change "intrerposed" to --interposed--.

Signed and Sealed this

Twenty-sixth Day of July, 1988

Attest:

DONALD J. QUIGG

*Attesting Officer*   *Commissioner of Patents and Trademarks*